May 24, 1960 S. LOEWE ET AL 2,937,817

QUICK-STOP LEVER ARRANGEMENT FOR MAGNETIC TAPE RECORDERS

Filed June 11, 1956

Inventors:

Siegmund Loewe

Werner Zorn

United States Patent Office 2,937,817
Patented May 24, 1960

2,937,817

QUICK-STOP LEVER ARRANGEMENT FOR MAGNETIC TAPE RECORDERS

Siegmund Loewe, 68 Ridge Road, Yonkers, N.Y., and Werner Zorn, Schillerstrasse 5, Berlin-Zehlendorf, Germany Filed June 11, 1956, Ser. No. 590,783

Claims priority, application Germany June 13, 1955

1 Claim. (Cl. 242—55.12)

The invention relates to a quick stop device for sound tape or film recorders more especially magnetic recorders having the tape reels driven by friction drives. It is the purpose of this invention to make possible a simple but secure operation of such a device by mechanical means.

The quick stop device forming the subject matter of the present invention is used for magnetic tape recorders, the tape reels of which are driven by friction drives, and comprises a lever system which on operation lifts the pressure pulley from the drive capstan and, at the same time, applies a braking effect on the tape reel and/or on one or more parts of the friction drive moving the tape reels of the recorder. The braking effect can also be applied on the friction disc instead of on the tape reel. In addition to this, a braking of the belt pulleys can also be made at the same time, if required. Similarly a braking of the motor is also possible.

It is furthermore possible to perform the braking effect simultaneously on several parts of the drive when desired, so, e.g. on the friction disc together with the belt pulleys and/or also on the motor itself. The braking effect may be performed for instance by pressing the braking shoes against the interior wall of a braking cylinder or inversely by pressing the braking shoes from outside against the outside wall of the braking cylinder.

Figure 1:
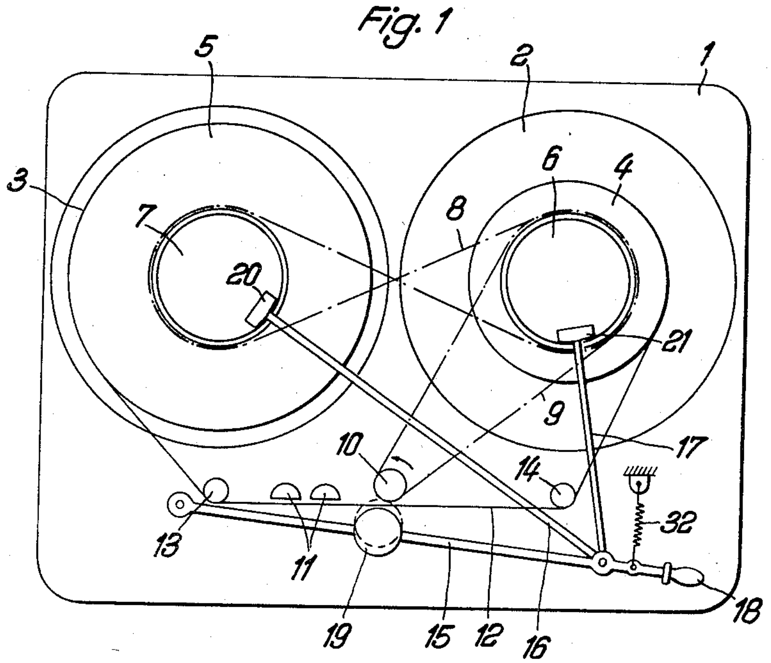
Figure 2:
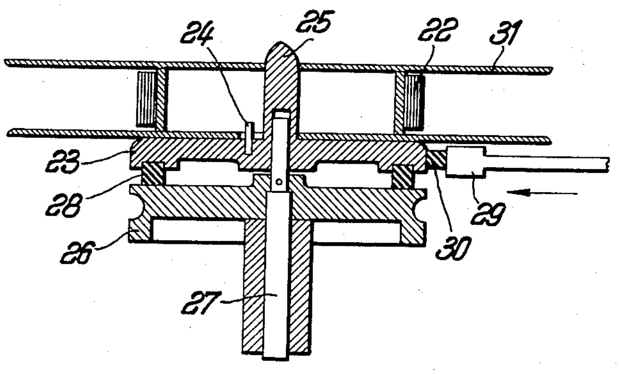

In the drawing an exemplary embodiment of the invention is shown for carrying out the inventive quick stop device. Fig. 1 is a view of the rear side of the lever system provided for the quick stop device and of the rear side of the mounting plate of a magnetic tape recorder. Fig. 2 is a section view through a tape reel with appertaining coupling links and braking device showing the brakes applied externally to the brake disc.

In Fig. 1, 1 designates the mounting or base plate of a magnetic tape recorder seen from the rear side. 2 and 3 represent the tape reels with the tape rolls 4 and 5. Elements 6 and 7 are the friction discs, which on the one side are firmly coupled to the tape reels, and on the other side connected via a friction coupling to the coaxial belt pulleys which in turn are coupled by means of the endless belt 8 placed crosswise and both turn in opposite direction. The friction disc 6 is now driven via the appertaining coaxial belt pulley and the endless belt 9 by the drive capstan 10 which is driven by the motor not shown. The two friction discs 6 and 7 carry out an oppositely directed rotatory movement. Elements 11 are the magnetic recording heads for erasing and reproduction or recording; the tape 12 is guided via the guide rollers 13 and 14 to the magnetic recording heads. Now, in accordance with the invention, the lever system 15, 16, 17 is provided which may be actuated by means of the handle 18. If, for example, the handle is moved downwards i.e. outwards, then first the pressure pulley 19, which is mounted on the lever 15, is lifted from the drive capstan 10 and, at the same time, the levers 16 and 17 are moved downwards i.e. outwards so that the appertaining brake shoes 20 and 21 are pressed against the cylindrical interior wall of the friction discs 6 and 7 which have the form of hollow cylinders opened at the bottom. Thus, the quick stop effect is attained. It is possible, of course—as already mentioned above—to apply additionally to this a simultaneous braking effect on, for example, the motor and thus, at the same time, to undertake a decoupling of the motor. With this, a sure quick stop is performed in any case.

Whilst Fig. 1 describes the use of an expanding brake, Fig. 2 shows the use of a contracting brake to the friction disc of the friction coupling for the drive of the tape reels. Fig. 2 represents a section through a tape reel 31 with the appertaining tape roll 22 and further links for the drive. Element 23 is the friction disc coupled to the reel 31 by the pin 24, its cone 25 serving as a reel carrier. The belt pulley 26 is fixed on the shaft 27 and is driven by the motor, not shown, or by the drive capstan. 28 is the friction lining between belt pulley and friction disc. Braking now results on the friction disc 23 by means of the brake link 29 which is pressed with its brake lining 30 against the outer edge of the friction disc 23. The brake link 29 is operated by a lever system which is formed similar to the lever device shown in Fig. 1. The sole difference is that in the arrangement used in Fig. 2 the lever system is so made that, on its operation, the braking effect is applied from outside on to the links to be braked, i.e. it must work in the opposite direction to Fig. 1.

By means of the invention, a simple and sure braking is obtained by mechanical means, assuring a quick stop effect.

The handle 18 of the rotatable lever 15 may, for example, be fitted with a spring which provides for the automatic return of the lever device to the rest position. In Fig. 1 this spring is designated by 32.

What we claim is:

In a magnetic tape recorder, two tape reels for winding and rewinding the tape, a drive capstan for driving the tape by friction effect, a pressure pulley for pressing the tape against said drive capstan, braking devices for braking said two tape reels, a rotatable lever for manual quick-stop operation, two further levers for actuating said braking devices together with the movement of said rotatable lever, said two levers connecting said rotatable lever with said braking devices being attached to said rotatable lever by a hinge, and said pressure pulley being mounted on said rotatable lever, whereby said rotatable lever is adapted to actuate said braking devices and simultaneously to lift said pressure pulley from the tape.

References Cited in the file of this patent

UNITED STATES PATENTS

| | | |
|---|---|---|
| 1,210,955 | Langheck | Jan. 2, 1917 |
| 2,675,973 | Reed et al. | Apr. 20, 1954 |

FOREIGN PATENTS

| | | |
|---|---|---|
| 329,804 | Germany | Nov. 29, 1920 |